United States Patent [19]

Marinaccio et al.

[11] Patent Number: 4,888,115
[45] Date of Patent: Dec. 19, 1989

[54] CROSS-FLOW FILTRATION

[75] Inventors: Paul J. Marinaccio, Monroe; Ronald V. Repetti, Old Greenwich, both of Conn.

[73] Assignee: Cuno, Incorporated, Meriden, Conn.

[21] Appl. No.: 566,839

[22] Filed: Dec. 29, 1983

[51] Int. Cl.$^4$ ............................................. B01D 13/00
[52] U.S. Cl. ..................................... 210/636; 210/638; 210/639; 210/651
[58] Field of Search ............... 210/651, 636, 638, 639, 210/500, 2, 321.1, 433.0, 927

[56] References Cited

U.S. PATENT DOCUMENTS

| | | | |
|---|---|---|---|
| 3,808,305 | 4/1974 | Gregor | 210/500.2 X |
| 4,051,300 | 9/1977 | Klein et al. | 210/500.2 X |
| 4,431,545 | 2/1984 | Pall et al. | 210/500.2 X |

OTHER PUBLICATIONS

Dorson et al., PCTWO82/03568, published 10-28-82.
Kesting, Synthetic Polymeric Membranes, 307 pages, p. 21.

*Primary Examiner*—Frank Spear
*Attorney, Agent, or Firm*—Weingram & Zall

[57] ABSTRACT

A process for the cross-flow filtration of a liquid comprising circulating the liquid tangential to a charge modified organic polymeric microporous filter membrane. Preferably, the membrane comprises an organic polymeric microporous filter membrane which has a micro-structure throughout the membrane and an amount of a charge modifying agent bound to substantially all of the membrance micro-structure without substantial pore size reduction or pore blockage.

The process may be used for the filtration of liquids, particularly parenteral or biological liquids contaminated with charged particulate and for plasmapheresis, particularly in the form of hollow fiber tubes.

33 Claims, 4 Drawing Sheets

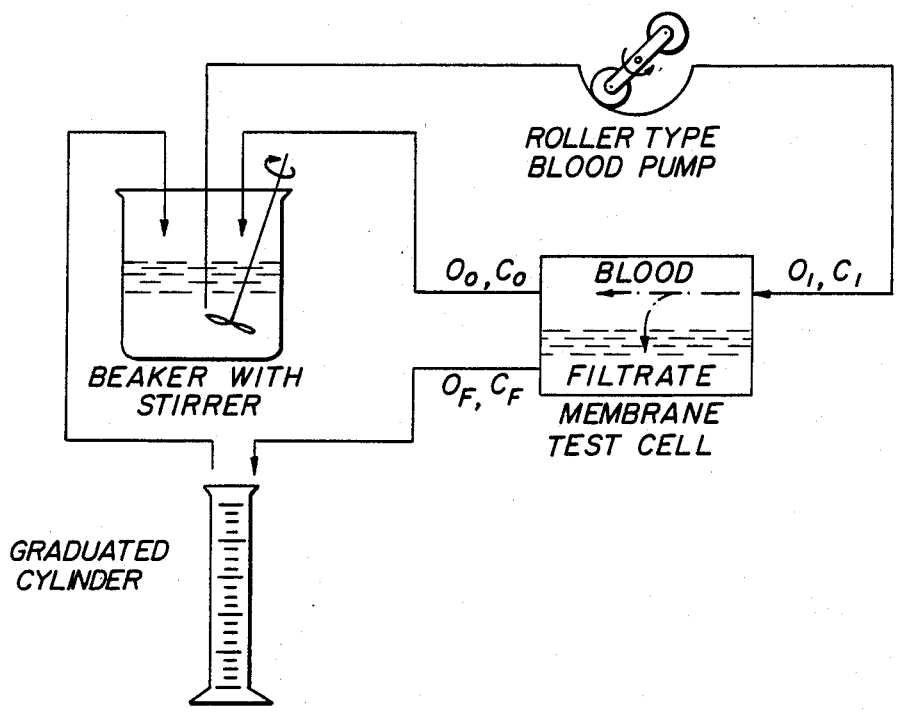
FIG-1 MEMBRANE TEST APPARATUS
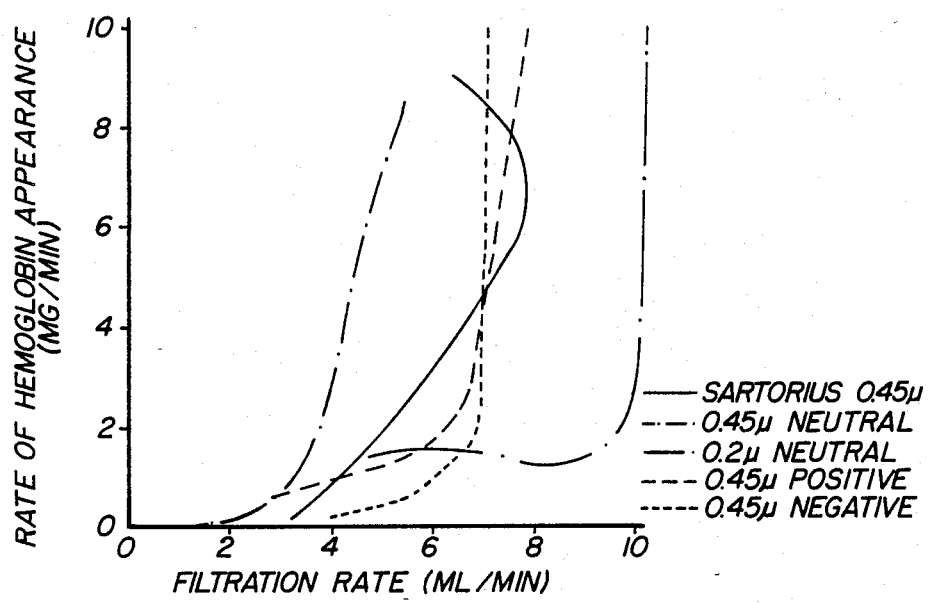
FIG-2 HEMOGLOBIN APPEARANCE RATE AS A FUNCTION OF THE FILTRATION RATE

FIG-3 APPARATUS
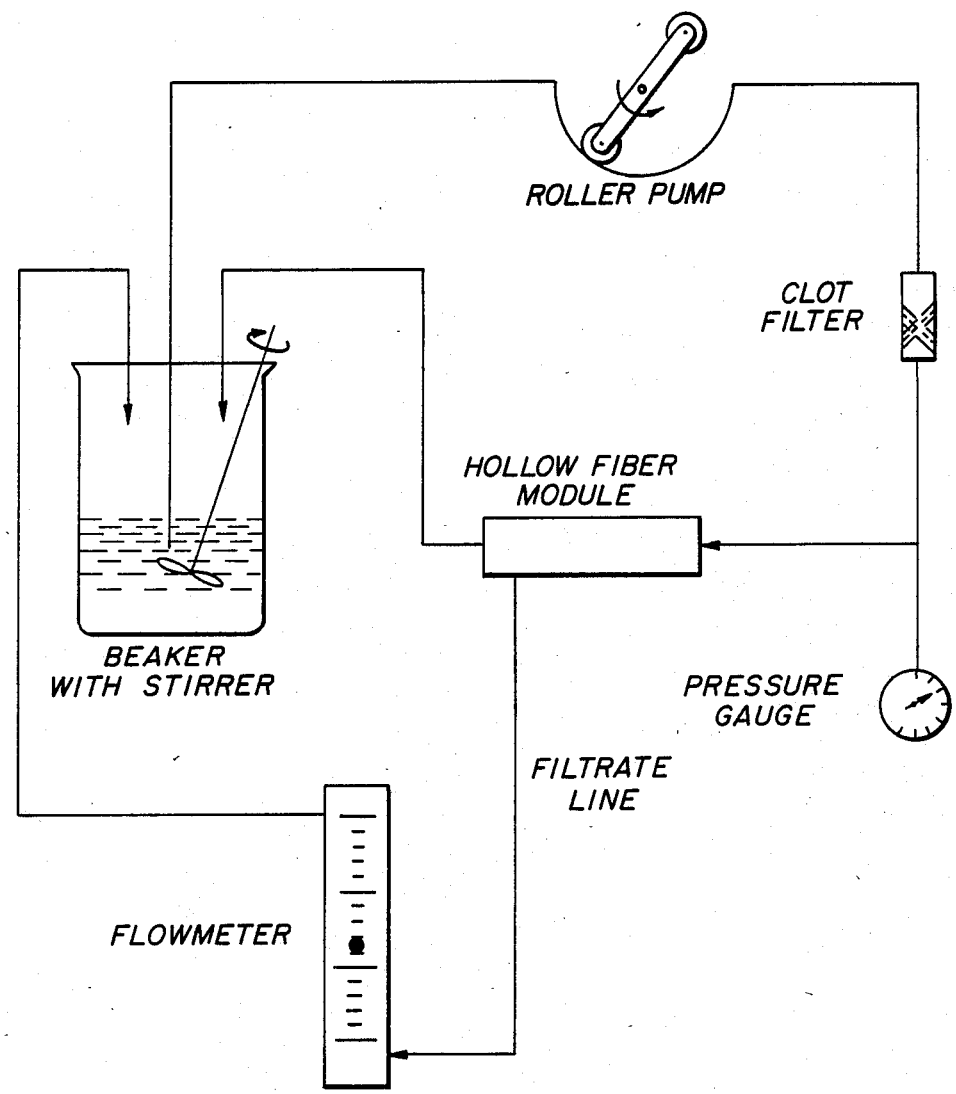

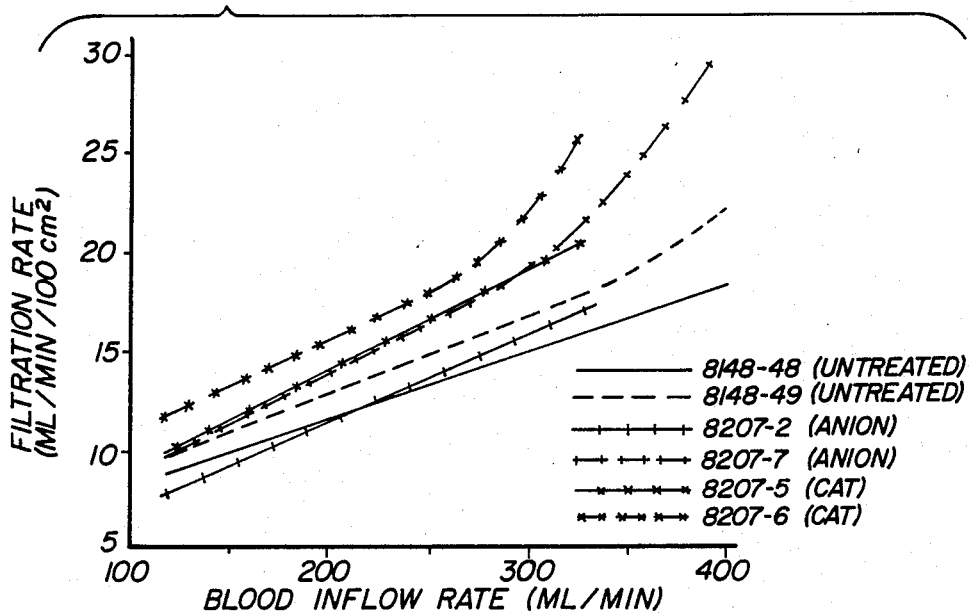
FIG-4 FILTRATION CHARACTERISTICS
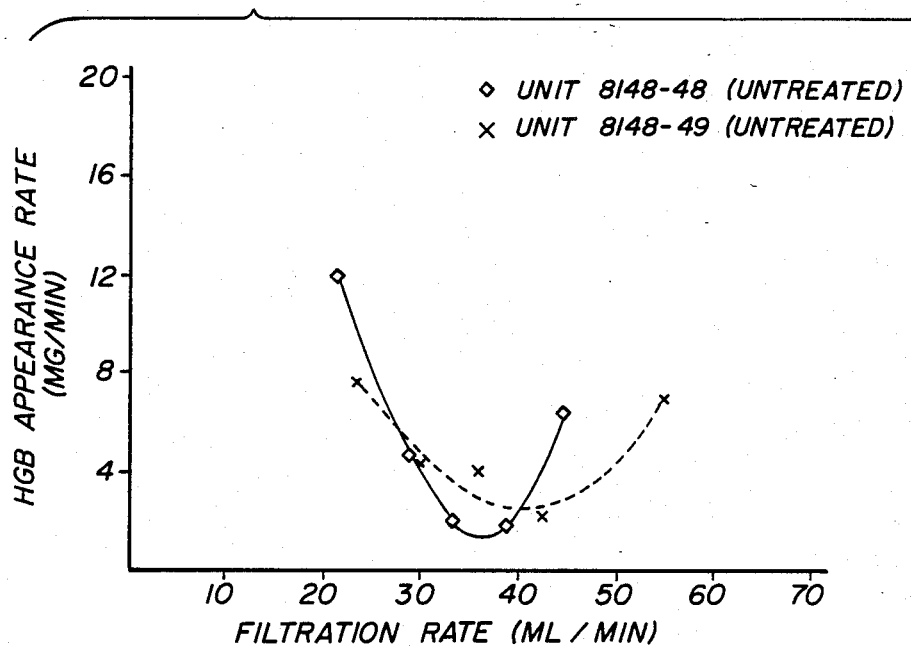
FIG-5 UNMODIFIED SURFACE

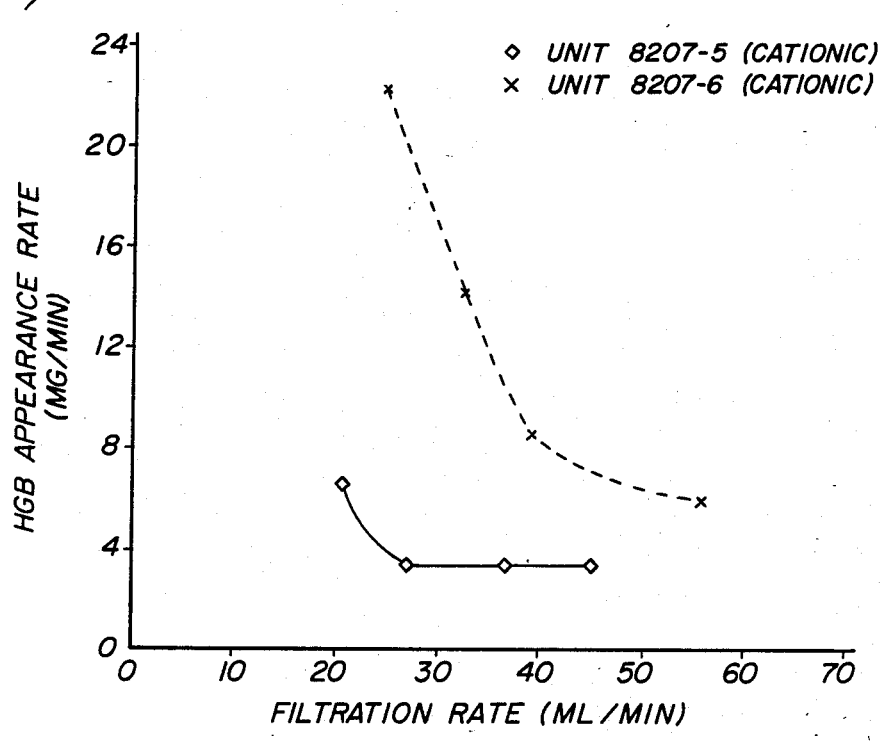
FIG-6 CATIONIC MODIFIED SURFACE
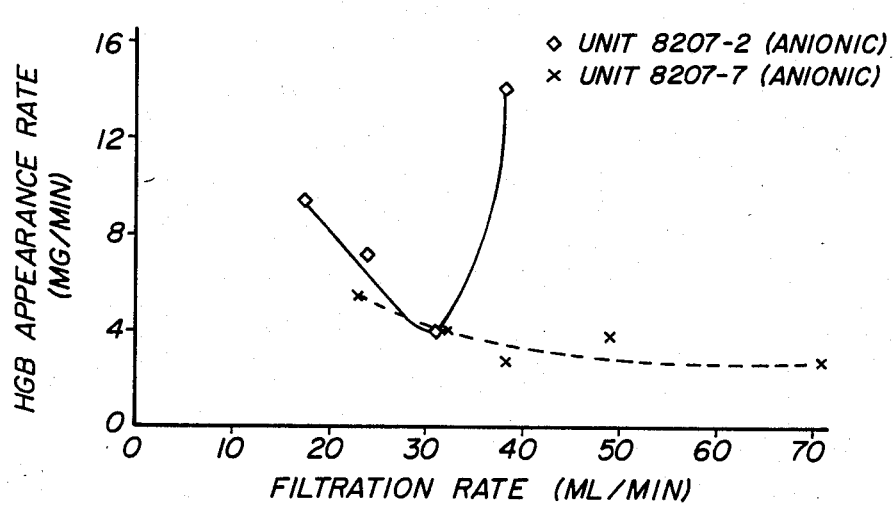
FIG-7 ANIONIC MODIFIED SURFACE

CROSS-FLOW FILTRATION

BACKGROUND OF THE INVENTION

1. FIELD INVENTION

This invention relates to cross-flow filtration and more particularly to the use of charge modified organic polymeric microporous membranes for the cross-flow filtration of liquids fluids, such as biological liquids, for example plasmapheresis.

2. Prior Art

Microporous membranes are well known in the art. For example, U.S. Pat. No. 3,876,738 to Marinaccio et at (1975) describes a process for preparing a microporous membrane, for example, by quenching a solution of a film forming polymer in a nonsolvent system for the polymer. European patent application 0 005 536 (1979) and U.S. Pat. No. 4,340,479 both to Pall describe a similar process.

Other processes for producing microporous membranes are described, for example, in the following U.S. Pat. Nos:

3,642,668 to Bailey et al (1972);
4,203,847 to Grandine, II (1980);
4,203,848 to Grandine, II (1980); and
4,247,498 to Castro (1981).

Commercially available microporous membranes, for example, made of nylon, are available from Pall Corporation, Glen Cove, New York under the trademark ULTIPOR $N_{66}$. Another commercially significant membrane made of polyvinylidene fluoride is available from Millipore Corp., Bedford, Massachusetts under the trademark DURAPORE. This membrane is probably produced by the aforementioned Grandine, II patents. Such membranes are advertised as useful for the sterile filtration of pharmaceuticals, e.g. removal of microorganisms.

Various studies in recent years, in particular Wallhausser, Journal of Parenteral Drug Association, June 1979, Vol. 33 #3, pp. 156-170, and Howard et al, Journal of the Parenteral Drug Association, March-April, 1980, Volume 34, #2 pp. 94-102, have reported the phenomena of bacterial break-through in filtration media, in spite of the fact that the media had a low micrometer rating. For example, commercially available membrane filters for bacterial removal are typically rated as having an effective micrometer rating for the microreticulate membranes structure of 0.2 micrometers or less, yet such membranes typically have only a 0.357 effective micrometer rating for spherical contaminant particles, even when rated as absolute for Ps. diminuta, the conventional test for bacterial retention. Thus passage of few microorganisms through the membrane may be expected under certain conditions and within certain limits. This problem has been rendered more severe as the medical uses of filter membranes increases. Brown et al highlights this problem in CRC Critical Reviews in Environment Control, March 1980, page 279 wherein increased patient mortality and morbidity derived from contamination of sterile solutions for topical, oral, and intravenous therapy are reported.

One method of resolving this problem and its inevitable consequences, is to prepare a tighter filter, i.e. one with a sufficiently small effective pore dimension to enable the capture of the fine particulate, e.g., microorganisms, by mechanical sieving. Such filter structures, in the form of microporous membranes of 0.1 micrometer rating or less, may be readily prepared. The flow rate, however, exhibited by such structure at conventional pressure drops is low. Thus such modification of the internal geometry, i.e. pore size, of the microporous membrane is not an economical solution to the problem of bacterial breakthrough.

Attempts to increase the short life of filter media due to pore blockage and enhance flow rates through filter media having small pores have been made by charge modifying the media by various means to enhance capture potential of the filter. For example, U.S. Pat. Nos. 4,007,113 and 4,007,114 to Ostreicher, describes the use of a melamine formaldehyde cationic colloid to charge modify fibrous and particulate filter elements; U.S. Pat. No. 4,305,782, to Ostreicher et al describes the use of an inorganic cationic colloidal silica to charge modify such elements; and U.S. Ser. No. 164,797 filed June 30, 1980, now abandoned, to Ostreicher et al, describes the use of a polyamido-polyamine epichlorhydrin cationic resin to charge modify such filter elements. Similar attempts at cationic charging of filter elements were made in U.S. Pat. No. 3,242,073 (1966) and 3,352,424 (1967) to Guebert et al; and U.S. Pat. No. 4,178,438 to Hasse et al (1979).

Cationically charged membranes which are used for the filtration of anionic particulate contaminants are also known in the art. For Example charge modified filter membranes are disclosed in the Assignee's Japanese Pat. No. 923649 and French Pat. No. 7415733. As disclosed therein, an isotropic cellulose mixed ester membrane, was treated with a cationic colloidal melamine formaldehyde resin to provide charge functionality. The membrane achieved only marginal charge modification. Additionally, the membrane was discolored and embrittled by the treatment, extractables exceeded desirable limits for certain critical applications, and the membrane was not thermally sanitizable or sterilizable. Treatment of the nylon membranes prepared by the methods described in U.S. Pat. No. 2,783,894 to Lovell (1957) and U.S. Pat. No. 3,408,315 to Paine (1968) is suggested. Nylon membranes so treated also demonstrate marginal charge modification, high extractables and/or are not thermally sanitizable or sterilizable.

Assignee in order to solve the aforementioned problems has developed unique cationic charge modified microporous membranes for use in the filtration of fluids. These cationic membranes, their preparation and use are described and claimed in U.S. patent application Ser. No. 268,543, filed on May 29, 1981 in the name of Barnes et al, now U.S. Pat. No. 4,473,475 and EPC Pub. Nos. 0066 814, and U.S. patent application Ser. No. 314,307, filed on Oct. 23, 1981 in the name of Ostreicher et al, now U.S. Pat. No. 4,473,474 and EPC Pub. Nos. 0050 864.

Cationic charge modified nylon membranes covered by these inventions are now being sold by AMF CUNO Division under the trademark ZETAPOR. Pall Corp., Glen Cove, New York is also selling a cationic charge modified nylon membrane under trademark $N_{66}$ POSIDYNE.

Assignees have developed an anionically charged microporous filter membrane for the removal of fine charged particulates from liquids, see copending USSN 566,764, now U.S. Pat. No. 4,604,208, entitled ANIONIC CHARGE MODIFIED MICROPOROUS MEMBRANE, PROCESS FOR CHARGE MODIFYING SAID MEMBRANE AND PROCESS FOR FILTRATION OF FLUID; however, to Applicants' knowledge, prior to this invention, no one has used such charge modified microporous filter membrane for cross-flow filtration.

OBJECTS AND SUMMARY OF THE INVENTION

It is an object of this invention to provide a process for the cross-flow filtration of liquids using charge modified microporous filter membranes.

It is another object of this invention to provide a process for plasmapheresis using charge modified membrane, particularly in the form of hollow tubes or hollow fibers.

These and other objects of this invention are attained by a process for the cross-flow filtration of a liquid comprising circulating the liquid tangential to charge modified organic polymeric filter membrane. Preferably, the membrane comprises a hydrophilic organic polymeric microporous membrane having a microstructure throughout the membrane and a charge modifying amount of a charge modifying agent bonded to substantially all of the membrane microstructure without substantially pore size reduction or pore blockage.

The preferred microporous filter membrane is nylon. The preferred anionic charge modifying agents have carboxyl (COOH) or sulfonic SO$_3$H) anionic functional substituents. These preferred anionic charge modified membranes for use in cross-flow filtration are described in Assignee's copending U.S. application Ser. No. 566,764, now U.S. Pat. No. 4,604,208, entitled ANIONIC CHARGE MODIFIED MICROPOROUS MEMBRANE, PROCESS FOR CHARGE MODIFYING SAID MEMBRANE AND PROCESS FOR FILTRATION OF FLUID the entire disclosure of which is incorporated herein by reference. The preferred cationic charge modified membranes are discribed in Assignees copending U.S. application Ser. No. 268,543 to Barnes et al now U.S. Pat. No. 4,473,475 and EPC Publication No. 0066 814, and U.S. application Ser. No. 314,307, to Ostreicher et al, now U.S. Pat. No. 4,473,474 and EPC Publication Nos. 0050 864, the entire disclosures of which are incorporated herein by reference.

The charge modified microporous membranes are used for the cross-flow filtration of liquids, particularly parenteral or biological liquids particularly blood, e.g., plasmapheresis. The membranes may, for example, be in the form of films or hollow tubes.

BRIEF DESCRIPTION OF THE FIGURES

FIG. 1 is a schematic of the system employed in Example IV herein.

FIG. 2 is a summary plot of the five membranes evaluated in Example IV.

FIG. 3 is a schematic of the system employed in Example V herein.

FIGS. 4–7 are summary plots for Example V herein.

DETAILED DESCRIPTION OF THE INVENTION

The charge modified microporous membranes used in this invention are produced from organic polymeric microporous membrane. Such membranes are well known in the art.

By the use of the term "microporous filter membrane" as used herein, it is meant an asymmetric or symmetric, microporous membrane having a pore size of at least 0.05 microns or larger, or an initial bubble point (IBP), as that term is used herein, in water of less than 120 psi. A maximum pore size useful for this invention is about 1.2 micron or an IBP of greater than about 10 psi. Additionally, the membrane has a fine microstructure throughout the membrane. By "symmetrical" it is meant that the pore structure is substantially the same on both sides and throughout the membrane. By the use of the term "asymmetric" it is meant that the pore size differs from one surface to the other. A number of commercially available membranes not encompassed by the term "microporous filter membrane" are those having one side formed with a thin skin which is supported by a much more porous open structure which are typically used for reverse osmosis, ultrafiltration and dialysis. Thus by the use of the term "microporous filter membrane" it is meant membranes suitable for the removal of suspended solids and particulates from fluids which permit dissolved solids to pass therethrough. These membranes, however, may have other uses both known and unknown.

By the use of the term "hydrophilic" in describing the preformed and the charge modified microporous membrane of this invention, it is meant a membrane which adsorbs or absorbs water. Generally, such hydrophilicity is produced by a sufficient amount of hydroxyl (OH—), carboxyl (—COOH), amino (—NH$_2$) and/or similar functional groups on the surface of the membranes. Such groups assist in the adsorption and/or absorption of water onto the membrane. Such hydrophilicity of the membrane and internal microstructure (which may be obtained or enhanced by treatment of the preformed membrane) is usually a necessary element for the preformed membrane which is treated in order to provide the adequate inclusion of the charge modifying agent to the microporous membrane internal microstructure. Such hydrophilicity of the charge modified membrane is necessary in order to render the membrane more useful for the filtration of aqueous fluids.

A preferred microporous filter membrane is one produced from nylon. The term "nylon" is intended to embrace film forming polyamide resins including copolymers and terpolymers which include the recurring amido grouping. While, generally, the various nylon or polyamide resins are all copolymers of a diamine and a dicarboxylic acid, or homopolymers of a lactam or an amino acid, they vary widely in crystallinity or solid structure, melting point, and other physical properties. Preferred nylons for use in this invention are copolymers of hexamethylene diamine and adipic acid and homopolymers of polyo-caprolactam.

Alternatively, these preferred polyamide resins have a ratio of methylene (CH$_2$) to amide (NHCO) groups within the range about 5:1 to about 8:1, most preferably about 5:1 to about 7:1. The preferred nylon 6 and nylon 66 each have a ratio of 6:1, whereas nylon 610 has a ratio of 8:1.

The nylon polymers are available in a wide variety of grades, which vary appreciably with respect to molecular weight, within the range from about 15,000 to about 42,000 and in other characteristics.

The highly preferred species of the units comprising the polymer chain is polyhexamethylene adipamide, i.e. nylon 66, and molecular weights in the range above about 30,000 are preferred. Polymers free of additives are generally preferred, but the addition of antioxidants or similar additives may have benefit under some conditions.

The preferred membrane substrates are produced by the method disclosed in U.S. Pat. No. 3,876,738 to Marinaccio et al. Another similar method of producing such membranes is described in European patent application No. 0 005 536 and U.S. Pat. No. 4,340,479 to Pall. The entire disclosures of all of these references are incorporated herein by reference.

Additionally, any of the hydrophilic microporous membranes commercially available, for example, Pall Corp.'s ULTIPOR $N_{66}$ (nylon), Millipore's DURAPORE (polyvinylidene floride) and cellulose acetate/nitrate membranes, produced by numerous companies, having characteristics potentially suitable for fine filtration of fluids, particularly, aqueous systems, are suitable for charge modification.

The preferred Marinaccio et al process for producing membrane develops a unique fine microstructure throughout the membrane through the quench technique described therein, offering a superior substrate for filtration. Broadly, Marinaccio et al produces microporous films by casing or extruding a solution of a film-forming polymer in a solvent system into a quenching bath comprised of a non-solvent system for the polymer. Although the non-solvent system may comprise only a non-solvent, the solvent system may consist of any combination of materials provided the resultant non-solvent system is capable of setting a film and is not deleterious to the formed film. For example, the non-solvent system may consist of materials such as water/salt, alcohol/salt or other solvent-chemical mixtures. The Marinaccio et al process is especially effective for producing nylon films. More specifically, the general steps of the process involve first forming a solution of the film-forming polymer, casting the solution to form a film and quenching the film in a bath which included a non-solvent for the polymer.

The nylon solutions which can be used in the Marinaccio et al process includes solutions of certain nylons in various solvents, such as lower alkanols, e.g., methanol, ethanol and butanol, including mixtures thereof. It is known that other nylons will dissolve in solutions of acids in which it behaves as a polyelectrolyte and such solutions are useful. Representative acids include, for example, formic acid, citric acid, acetic acid, maleic acid and similar acids which react with nylons through protonation of nitrogen in the amide group characteristic of nylon.

The nylon solutions are diluted with non-solvent for nylon, the non-solvent employed being miscible with the nylon solution. Dilution with non-solvent may, according to Marinaccio et al, be effected up to the point of incipient precipitation of the nylon. The non-solvents are selected on the basis of the nylon solvent utilized. For example, when water-miscible nylon solvents are employed, water can be employed. Generally, the non-solvents can be methyl formate, aqueous lower alcohols, such as methanol and ethanol, polyols such as glycerol, gycols, polyglycols, and ethers and esters thereof, water and mixtures of such compounds. Moreover, salts can also be used to control solution properties.

The quenching bath may or may not be comprised of the same non-solvent selected for preparation of the nylon solution and may also contain small amounts of the solvent employed in the nylon solution. However, the ratio of solvent to non-solvent is lower in the quenching bath than in the polymer solution in order that the desired result be obtained. The quenching bath may also include other non-solvents, e.g., water.

The formation of the polymer film or hollow tubes can be accomplished by any of the recognized methods familiar to the art. The preferred method of forming the film is casting using a knife edge which controls the thickness of the cast film. The thickness of the film will be dictated by the intended use of the microporous product. In general, the films will be cast at thicknesses in the range of from about 1 mil. to about 20 mils., preferably from about 1 to about 10 mils. Preferably, the polymer solution is cast and simultaneously quenched, although it may be desirable to pass the cast film through a short air evaporation zone prior to the quench bath. This latter technique is, however, not preferred. After the polymer solution is cast and quenched, it is removed from the quench bath and preferably washed free of solvent and or non-solvent. Subsequently the film can be at least partially dried and then charge modified. Hollow tubes are formed by extrusion over a fluid core and quenching in an appropriate bath using appropriately designed and shaped nozzles. Such methods are well known in the art.

Pall's aforementioned European patent application No. 0 005 536 and U.S. Pat. No. 4,340,479 describe a similar method for the conversion of polymer into microporous membrane which may be used. Broadly, Pall provides a process for preparing skinless hydrophilic alcohol-insoluble polyamide membranes by preparing a solution of an alcohol-insoluble polyamide resin in a polyamide solvent. Nucleation of the solution is induced by the controlled addition to the solution of a non-solvent for the polyamide resin, under controlled conditions of concentration, temperature, addition rate, and degree of agitation to obtain a visible precipitate of polyamide resin particles (which may or may not partially or completely redissolve) thereby forming a casting solution.

The casting solution is then spread on a substrate to form a thin film. The film is then contacted and diluted with a mixture of solvent and non-solvent liquids containing a substantial proportion of the solvent liquid, but less than the proportion in the casting solution, thereby precipitating polyamide resin from the casting solution in the form of a thin skinless hydrophilic membrane. The resulting membrane is then washed and dried.

In Pall's preferred embodiment of the process, the solvent for the polyamide resin solution is formic acid and the non-solvent is water. The polyamide resin solution film is contacted with the non-solvent by immersing the film, carried on the substrate, in a bath of non-solvent comprising of water containing a substantial proportion of formic acid.

These preferred nylon membranes, i.e. described in Marinaccio et al and Pall, are characterized by a hydrophilic, isotropic structure, having a high effective surface area and a fine internal microstructure of controlled pore dimensions with narrow pore size distribution and adequate pore volume throughout the membrane structure. For example, a representative 0.22 micrometer rated nylon 66 membrane (polyhexamethylene adipamide) exhibits an initial bubble point (IBP) of about 45 to 50 psid., a foam all over point (FAOP) of about 50 to 55 psid., provides a flow of from 70 to 80 ml/min of water at 5 psid (47 mm. diameter discs), has a surface area (BET, nitrogen adsorption) of about 13 $m^2/g$ and a thickness of about 4.5 to 4.75 mils.

The charge modifying agent, e.g., anionic or cationic charge modifying agent, is preferably bound to substantially all of the internal microstructure of the microporous membrane. By the use of the term "bound" it is meant that the charge modifying agent is sufficiently attached to or incorporated into the membrane so that it will not significantly extract under the intended conditions of use. By the use of the term "substantially all of the internal microstructure" as used herein it is meant substantially all of the external surface and internal pore surfaces. Typically this is meant the surfaces which are wetted by a fluid, e.g., water, passing through the membrane or in which the membrane is immersed. By the use of the term "charge modifying agent", it is meant a compound or composition that when bound to the microporous filter membrane alters the "zeta potential" of the membrane (see Knight et al, "Measurement the Electrokinetic Properties of Charged Filter Media," Filtration and Separation, pp 30–34, Jan./Feb. 1981). The charge modifying agent can be part of the solvent-non-solvent casting system and/or quench bath or a subsequent treatment to the formed membrane.

The anionic or cationic charge modifying agent is a compound or composition which is capable of bonding to the membrane microstructure without substantial pore size reduction or pore blockage and provides an anionic or cationic charge or negative or positive zeta potential to the membrane microstructure. Preferably, such anionic or cationic charge modifier is a water soluble compound having substituents capable of binding to the membrane and substituents which are capable of producing a more negative or more positive "zeta potential" in the use environment (e.g. aqueous) or anionic or cationic functional groups.

Preferred anionic functional groups may be carboxyl, phosphonous, phosphonic and sulfonic. Preferably, the anionic charge modifying agent, may be a water soluble organic polymer having a molecular weight greater than about 2,000 and less than about 500,000 and capable of becoming a non-extractable constituent of the membrane.

The anionic charge modifying agent can also be cross-linked to the membrane through a cross-linking agent, for example, an aliphatic polyepoxide having a molecular weight of less than about 500 and, preferably, methylated urea formaldehyde resin and melamine formaldehyde.

The anionic charge modifying agents which may be used in this invention are polymeric anionic polyelectrolytes. Generally, these polyelectrolytes have relatively low molecular weight, e.g. less than 500,000 and are water or other solvent soluble at the desired levels of application. If the anionic agents are applied directly to the membrane it is necessary that they be capable of binding thereto. If they are applied to a cationically charge modified membrane (discussed below), they need only bond to the cationic charge on the membrane. The preferred membrane for use in this invention is nylon produced by process described in the aforementioned Pall and Marinaccio patents, which is inherently charged. This charge may be assist in bonding a charge modifying agent to the membrane.

The anionic charge modifying agent may have either a high or low charge density, or anything between these extremes, however, high charge density is preferred. Specific preferred anionic charge modifying agents useful herein are poly (styrene sulfonic) acid, poly (toluene sulfonic) acid, poly (vinyl sulfonic) acid and poly (acrylic) acid. Other anionic charge modifying agents are poly (methacrylic acid), poly (itaconic acid), hydrolyzed poly (styrene/maleic anhydride) and poly (vinyl phosphonic acid). Additionally, the alkali and alkaline earth metal salts of all of the foregoing may be utilized.

Highly preferred anionic charge modifying agents are poly (styrene sulfonic) acids:

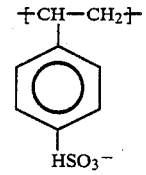

having a molecular weight between 2000 and 300,000; and poly (acrylic) acid:

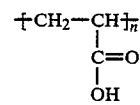

having a molecular weight between 2000 and 300,000.

The anionic charge modifying agent may also be cross-linked to the microporous membrane structure through an aliphatic polyepoxide cross-linking agent having a molecular weight of less than about 500. Preferably, the polyepoxide is a di- or tri-epoxide having a molecular weight of from about 146 to about 300. Such polyepoxides have viscosities (undiluted) of less than about 200 centipoise at 25° C.

Highly preferred polyepoxides have the formula:

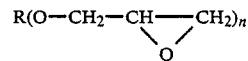

wherein R is an alkly of 1 to 6 carbon atoms and n is from 2 to 3. The limitation that the number of carbon atoms in the non-epoxide portion —(R)— be less than 6 is so that the polyepoxide will be soluble in water or ethanol-water mixtures, e.g. up to 20% ethanol. While higher carbon content materials are functionally suitable, their application would involve the use of polar organic solvents with resulting problems in toxicity, flammability and vapor emissions.

Certain diglycidyl ethers of aliphatic diols may be used as the polyepoxide cross-linking agents. These compounds may be represented as follows:

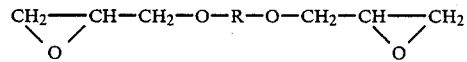

For example:
When R is $(CH_2)_2$, HO—R—OH is 1,2 -ethanediol
When R is $(CH_2)_3$, HO—R—OH is 1,3 -propanediol
When R is $(CH_2)_4$, HO—R—OH is 1,4 -butanediol The preferred diglycidyl ether of 1, 4-butanediol is commercially available from Ciba-Geigy, Inc. as RD-2 and from Celanese Corp. as Epi-Rez 5022 and Polyscience.

Other higher carbon diglycidyl ethers may be used as the polyepoxide cross-linking agent, for example when R is $(CH_2)_5$ the 1, 5-pentanediol diglycidyl ether is produced. As stated previously, however, the appropriate polar organic solvents must be used for diluting such polyepoxides.

Triglycidyl ethers, i.e. tri-epoxides may also be utilized as the polyepoxide cross-linking agent. For example, the triglycidyl ether of glycerol may be utilized. The tri-epoxides have the following formula:

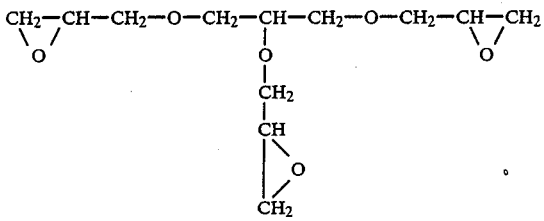

The triglycidyl ether of glycerol is available from Shell, Inc. as Epon 812 and Celanese Corp. as Epi-Rez 5048.

Another preferred cross-linking agent is methylated urea formaldehyde resin, commercially available from American Cyanamid; for example, Beetle 65, and melamine formaldehyde, e.g., Cymel 303 from American Cyanamide.

Optionally, the anionic charge modifying agent may be applied to a membrane which has been previously treated to produce a cationic charge modified membrane. Preferred membranes and methods of producing such cationic charge modified membranes are described in Assignees aforementioned applications and European publications to Barnes et al (USSN 268,543, now U.S. Pat. No. 4,473,475, and EPC 066814) and Ostreicher et al (USSN 314,307, now U.S. Pat. No. 4,473,474, and EPC 0050 864). The entire disclosures of these applications and publications are incorporated herein by reference.

Treating a cationically charge modified membrane in accordance with this invention enhances the bonding of the anionic charge modifier to the membrane and/or reduces the requirements for a cross-linking agent.

The process for anionically charge modifying a hydrophilic organic polymeric microporous membrane, e.g. nylon, comprises applying and binding to substantially all of the membrane microstructures, without substantial pore size reduction or pore blockage, a charge modifying amount of the anionic charge modifying agent. Preferably, the process comprises (a) contacting the membrane with an aqueous solution of the anionic charge modifying agent; and (optionally) (b) contacting the membrane with an aqueous solution of the cross-linking agent. The contacting steps may be performed in any order, i.e. step (a) followed by step (b), vice versa or simultaneously. It is preferred, to perform steps (a) and (b) simultaneously to minimize extractables and for ease of manufacture.

In order to provide the charge modifying amount of anionic charge modifying agent to the membrane, it is preferred that the aqueous solution of anionic charge modifying agent that the membrane is contacted with contain at least about 0.5% by weight charge modifying agent in the aqueous solution. The upper range is limited by economic and solubility limitations. For example, an excess of charge modifying agent which is not bonded to the microporous membrane will not be economically utilized and will constitute an undesirable extractive from the membrane. It has been found that the amount of charge modifying agent in the aqueous solution should not exceed about 10% by weight of the solution.

The amount of cross-linking agent used in the aqueous solution is highly dependent on the specific cross-linking agent and the amount and type anionic charge modifying agent used, and the cross-linking mechanism between these compounds to provide the bonding of such charge modifying agent to the microporous membrane. For general guidance however, it has been found that a weight ratio of anionic charge modifying agent to cross-linking agent of from about 1:1 to about 500:1, preferably from about 1:1 to about 20:1 in the aqueous solutions contacted with the membrane, is generally sufficient to provide the binding of the anionic charge modifying agent to the membrane. It has been found that if the aqueous solution containing the cross-linking agent contains at least about 0.1% cross-linking agent by weight of the solution, up to a maximum of about 5% weight of the solution when used in conjunction with the aforementioned aqueous solution of anionic charge modifying agent, that adequate bonding of the charge modifying agent to the microporous membrane is obtained.

Both the anionic charge modifying agent and the cross-linking agent may be contacted with the membrane by dipping the membrane in the aqueous solutions of these compounds for a period of time sufficient to effect the desired degree of pick-up. Alternatively, the agents may be applied by spraying or contacting a wick or roll along the surface of the microporous membrane which almost immediately adsorbs and/or absorbs the aqueous solution due to the membrane's hydrophilicity.

The preferred cationic membranes used in this invention are described in the aforementioned Barnes et al and Ostreicher et al publications and applications.

The preferred charge modifying agent, i.e. primary charge modifying agent described in Ostreicher et al is a water-soluble organic polymer having a molecular weight greater than about 1,000, wherein the monomer has at least one epoxide substituent capable of bonding to the surface of the membrane and at least one tertiary amine or quaternary ammonium group capable of providing a cationic charge site. Preferably, this charge modifier is a polyamidopolyamine epichlorohydrin cationic resin, in particular, those described in the following U.S. Pat. Nos.:

2,926,116 to Keim
2,926,154 to Keim
3,224,986 to Butler et al.
3,311,594 to Earle, Jr.
3,332,901 to Keim
3,382,096 to Boardman
3,761,350 to Munjat et al.

The entire disclosures of all of these references are incorporated herein by reference.

The preferred polyamido-polyamine epichlorohydrin cationic resins are available commercially as Polycup 172, 1884 (MW about 3000,000), 2002 or S 2064 (Hercules); Cascamide Resin pR-420 (Borden); or Nopcobond 35 (Nopco). Most preferably, the polyamido-polyamine epichlorohydrin resin is Hercules R 4308 (MW about 530,000), wherein the charged nitrogen atom forms part of a heterocyclic grouping, and is bonded through a methylene moiety to a depending, reactive epoxide group.

Most preferably, when the charge modifying agent is a water-soluble organic polymer having a molecular weight greater than about 1,000, a secondary charge modifying agent can be used to enhance the cationic modifying agent and/or enhance the bonding of the primary charge modifying agent to the microporous surface and/or itself.

The secondary charge modifying agent may be selected from the group consisting of:
(i) aliphatic polyamines having at least one primary amine or at least two secondary amine moieties; and
(ii) aliphatic amines having at least one secondary amine and a carboxyl or hydroxyl substituent.

Preferably, the secondary charge modifying agent is a polyamine having the formula:

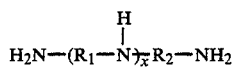

wherein $R_1$ and $R_2$ are alkyl of 1 to 4 carbon atoms and x is an integer from 0 to 4. Preferably $R_1$ and $R_2$ are both ethyl.

Preferred polyamines are:

Ethylene diamine          $H_2N-(CH_2)_2-NH_2$

Diethylenetriamine        $H_2N-(CH_2)_2-NH-(CH_2)_2-NH_2$

Triethylenetetramine      $H_2N-(CH_2-CH_2-NH)_2-CH_2-CH_2-NH_2$

Tetraethylenepentamine    $H_2N-(CH_2-CH_2-NH)_3-CH_2-CH_2-NH_2$

The preferred polyamine is tetraethylene pentamine.

Alternatively, aliphatic amines used herein may have at least one secondary amine moiety and a carboxyl or hydroxyl substituent. Exemplary of such aliphatic amines are gamma aminobutyric acid ($H_2NCH_2CH_2CH_2COOH$) and 2-aminoethanol ($H_2NCH_2CH_2OH$).

The secondary charge modifying agent is bonded to the microporous membrane by bonding to a portion of the epoxide substituents of the polymeric primary charge modifying agent.

The amount of primary and secondary cationic charge modifying agent utilized is an amount sufficient to enhance the electropositive capture potential of the microporous membrane. Such an amount is highly dependent on the specific charge modifying agents utilized.

Broadly, the foregoing primary and secondary cationically charge modifying agents are bonded to a hydrophilic organic polymeric microporous membrane, e.g., nylon, by applying to the membrane a charge modifying amount of the primary cationic charge modifying agent bonded to the membrane structure through the epoxide substituent. Preferably, the process comprises (a) contacting the membrane with an aqueous solution of the primary cationic charge modifying agent and (b) contacting the membrane with an aqueous solution of the secondary charge modifying agent. The contacting steps may be performed in any order, e.g., step (a) prior to step (b) or vice-versa. It is preferred, however, for optimum (minimum) extractables to first contact the membrane with an aqueous solution of the primary cationic charge modifying with an aqueous solution of the primary cationic charge modifying agent and then subsequently contact the so treated membrane with the aqueous solution of the secondary charge modifying agent.

In another embodiment of the present invention the foregoing secondary charge modifying agent can be used as the charge modifying agent provided it is bonded to the microporous membrane structure through the aforedescribed aliphatic poly-epoxide crosslinking agents used to produce the aforedescribed anionically charge modified membrane.

The aliphatic polyamine charge modifying agent can be bonded to the microporous membrane by (a) contacting the membrane with an aqueous solution of the cationic charge modifying agent and (b) contacting the membrane with an aqueous solution of the polyepoxide crosslinking agent. The contacting steps may be performed in any order, i.e., step (a) prior to step (b) or vice-versa. Such contacting steps also include contacting the membrane with an aqueous solution of a mixture of the charge modifying agent and the polyepoxide crosslinking agent. It is preferred, however, for optimum (minimum) flushout times to first contact the membrane with an aqueous solution of the cationic charge modifying agent and then subsequently contact the so treated membrane with the aqueous solution of the polyepoxide crosslinking agent. For maximizing charge modification, however, it is preferred to contact the membrane with an aqueous solution of a mixture of the charge modifying agent and the polyepoxide crosslinking agent.

Between each contacting step of the process for producing the membrane, the membrane is drained for a period of time sufficient to remove most of the water and chemical compound(s) not absorbed or adsorbed onto the surface of the membrane. The membrane may be transferred directly from the first contacting step to a subsequent contacting step, although this is less preferred. An intermediate treatment may also be a restrained drying step.

After the microporous membrane has been contacted with the aqueous solution(s), it may then be washed, dried and cured, preferably in a restrained condition to prevent shrinkage.

Preferably, prior to charge modifying the membrane film may be laminated to another membrane, or optionally laminated to a reinforcing web to form a reinforced laminated filtration membrane. Unique reinforced membranes and their methods of production are described and claimed in Assignee's U.S. Ser. No. 332,068 to Barnes et al filed Dec. 18, 1981, now U.S. Pat. No. 4,473,475, the entire disclosure of which is incorporated herein by reference. Preferably, lamination is accomplished by passing the plurality of layers juxtaposed upon each other through heated rollers to heat laminate and dry the membranes together. Preferably such drying is under restraint to prevent shrinkage. Drying of the membranes under restraint is described in the Assignee's Defensive Publication No. T-102,601, to Repetti published on Nov. 1, 1983. The entire disclosure of this publication is incorporated herein by reference. Generally, any suitable restraining technique may be used while drying, such as winding the membrane tightly about a dry surface, e.g. a drum. Bi-axial control is preferred and tensioning the laminated membrane is considered the most preferred.

The final drying and curing temperature for the membrane should be sufficient to dry and cure the membranes. Preferably this temperature is from about 120° C. to 140° C. for minimization of drying time with embrittlement or other detrimental effects to the membranes. The total thickness of the filtration membrane is preferably from about 3 mils to about 30 mils and most preferably about 3 to 15 mils thick (dry thickness).

The filtration membrane may then be rolled and stored under ambient conditions for further processing into the usual commercial forms, for example, as discs or pleated cartridges by methods well known to the art.

Hollow fibers of membranes may be similarly and appropriately treated and processed into cartridges by methods known in the art.

The membranes used in this invention are integral, coherent hydrophilic microporous membranes of retained internal pore geometry. The charge modified membrane not only has an improved effective filtration rating relative to the untreated micro-reticulate polymer structure for oppositely charged submicronic particulate contaminants in conventional filtration, but have decreased adsorptive capacity for like charged submicronic particulate. In cross-flow filtration these like charged particulates are desirably retained in the effluent liquid for they are contaminant particulates that can cause pore blockage of the membrane. These properties are brought about by charge sites or regions attached to, bonded to or populating the microstructure or pore surfaces throughout the membrane. These charge sites are effective over a broad range of pH's in enhancing cross-flow filtration performance through electrokinetic effects. The proper choice of charge modifying agent, cross-linking agent and process conditions assures that the foregoing is accomplished without substantial pore size reduction or pore blockage.

The charge modified membranes offer cross-flow filtration effectiveness, particularly in plasmapheresis. Adsorption of oppositely charged particulate or consistituents is minimized or eliminated.

For so-called sterile filtrations or plasmapheresis involving biological liquids, the filter is sanitized or sterilized by autoclaving or hot water flushing. Preparation for use in sterile filtration, requires that the membrane be sterilized as by treatment in an autoclave at 121° C. under 15 psig. for 1 hour. Accordingly, the charge modified membrane must be resistant to this type treatment, and must retain its integrity in use. Any modification of the filter structure, especially brought about by chemical agents which may be unstable under conditions of treatment and use, must be scrutinized with care to minimize the prospect of extractables contaminating the filtrate, interfering with analysed and potentially introducing harmful toxins to a patient. Specifically, any such filter must meet the test standards in the industry, e.g. ASTM D 3861-79 (incorporated herein by reference), and generally have less than 5 mg. of extractables in 250 ml solvent (water at 80° C.; 35% ethanol at room temperature) for a 293 mm diameter disc. The membrane and process of this invention insures low extraction levels.

Biological liquids, as that term is employed in the specifications and claims, is a liquid system which is derived from or amenable to use with living organisms. Such liquids are ordinarily handled and processed under sanitary or sterile conditions and therefore require sanitized or sterilized media for filtration. Included within such term are isotonic solutions for intermuscular (im) or intravenous (iv) administration, solutions designed for administration per os, as well as solutions for topical use, biological wastes or other biological fluids which may contain impurities.

The process of this invention may be employed alone or in combination with other filter media to treat pharmaceuticals such as antibodies, saline solutions, dextrose solutions, vaccines, blood plasma, serums, sterile water or eye washes; beverages, such as cordials, gin, vodka, beer, scotch, whisky, sweet and dry wines, champagne or brandy; cosmetics such as mouthwash, perfume, shampoo, hair tonic, face cream or shaving lotion; food products such as vinegar, vegetable oils; chemicals such as antiseptics, insecticides, photographic solutions, electroplating solutions, cleaning compounds, solvent purification and lubrication oils, and the like. The charge modified membranes, particularly in the form of hollow microporous tubes, are particularly suitable for plasmapheresis, as well as conventional crossflow filtration of liquids containing particulate contaminants.

By the use of the term "cross-flow filtration" it is meant the separation of undissolved particulate and suspended solids from a fluid, e.g., liquid blood, mixture by passing or circulating parallel or tangential to the surface of the membrane the fluid mixture producing a circulating effluent of concentrated particles or solids continuing to flow tangential to the membrane. Such techniques are well known in the art, particularly for plasmapheresis, however, charge modified membranes, particularly the preferred membranes described herein have not been utilized for cross-flow filtration, including plasmapheresis. It is believed that the charge of the membrane prevents the predominantly similarly charged particulate or suspended solids in the fluid from clogging or blocking the pores by preventing excessive adsorption thereof, thus enhancing the efficiency and effectiveness of cross-flow filtration.

Having now generally described this invention, the same will become better understood by reference to certain specific examples, which are included herein for the purposes of illustration only and are not intended to be limiting of the invention.

EXAMPLES

The following are the measurement and test procedures utilized in all the Examples.

Thickness

The dry membrane thickness was measured with a 1 inch (1.27 cm) diameter platen dial thickness gauge. Gauge accuracy was +0.00005 inches (+0.05 mils).

Initial Bubble Point (IBP) and Foam-All-Over Point (FAOP) Tests

A 47 mm diameter disc of the membrane sample is placed in a special test holder which seals the edge of the disc. Above the membrane and directly in contact with its upper face, is a perforated stainless steel support screen which prevents the membrane from deforming or rupturing when air pressure is applied to its bottom face. Above the membrane and support screen, the holder provides an inch deep capacity into which distilled water is introduced. A regulated air pressure is increased until a first stream of air bubbles is emitted by the water wetted membrane into the quiescent pool of water. The air pressure at which this first stream of air bubbles is emitted is called the Initial Bubble Point (IBP) of the largest pore in that membrane sample - see ASTM F-316-70 which is incorporated herein by reference.

Once the Initial Bubble Point pressure has been determined and recorded, the air pressure is further increased until the air flow through the wetted membrane sample, as measured by a flow meter in the line between the regulator and the sample holder, reaches 1000 cc/min. The air pressure at this flow rate, is called the Foam-All-Over-Point (FAOP), and is directly proportional to the mean pore diameter of the sample membrane. In this series of tests, these two parameters (IBP and FAOP) are used to determine if any change has occurred in the maximum or mean pore size of the membrane sample as a result of the charge modifying process utilized.

Flow Rate Test

A 47 mm diameter disc of the membrane sample is placed in a test housing which allows pressurized water to flow through the membrane. Prefiltered water is passed through the membrane sample at a pressure differential of 5 psid. A graduated cylinder is used to measure the volume of water passed by the membrane sample in a one minute period. In this series of test this parameter is used in conjunction with the IBP or FAOP to determined if any reduction in pore size or pore blockage has occurred as a result of the anionic charge modifying process utilized.

Methylene Blue Dye Tests For Anionic Membrane

A 47 mm diameter disc of the membrane sample is placed in a test housing which allows pressurized water to flow thru the membrane. The challenge solution consists of distilled water at a pH of 7.0, and methylene blue dye. The dye inlet concentration is adjusted to produce a 34 percent transmittance at a wavelength of 660 nm, as measured on a Bausch & Lomb Spectronic 710 Spectrophotometer. By means of a peristaltic pump the challenge solution is flowed thru the membrane sample at a flow rate of 28 ml/min. The transmittance of the effluent is measured by passing it thru a constant flow cell in the aforementioned spectrophotometer. The effluent transmittance and pressure drop across the membrane is measured and recorded as a function of time. The test is terminated when the effluent transmittance increases to 45 percent of the inlet transmittance. In this series of tests, the length of time that it takes to reach the 45 percent transmittance in the effluent is called the "breakthru" time. Since methylene blue is a low molecular weight cationic dye incapable of being mechanically removed (filtered) by the membrane, this breakthru time is proportional to the anionic adsorptive capacity of the membrane sample. This test is therefore used to determine the effectiveness of the charge modification technique.

Extractables (ASTM D-3861-79)

Extractables are determined by ASTM D-3861-79. The quantity of water-soluble extractables present in membrane filters is determined by immersing a preweighed membrane in boiling reagent grade water for an extended time and then drying and reweighing the membrane. A control membrane is employed to eliminate weighing errors caused by balance changes or changing moisture content of the membrane in the weighing procedures. Weight changes of the control membrane are applied as a correction factor to the weight change of the test membrane filters.

EXAMPLE 1

Preparation Of Microporous Membrane

A representative nylon 66 membrane of 0.22 micrometer nominal rating, having a nominal surface area of about 13 m$^2$/g, an Initial Bubble Point of about 47 psi, a Foam-All-Over-Point of about 52 psi was prepared by the method of Marinaccio et al, U.S. Pat. No. 3,876,738, utilizing a dope composition of 16 percent by weight nylon 66 (Monsanto Vydyne 66B), 7.1% methanol and 76.9% formic acid, a quench bath composition of 25% methanol, 75% water by volume (regenerated as required by the method of Knight et al, U.S. Pat. No. 3,928,517) a casting speed of 24 inches/minute (61 cm/min.), and a quench bath temperature of 20° C. The membrane was cast just under the surface of the quench bath by application to a casting drum rotating in the bath (9 to 10 mils as cast wet, to obtain 4.5 to 5.5 mils dry) and allowed to separate from the drum about 90° of arc from the point of application. A portion of the uniform opaque film was dried (in restrained condition to resist shrinkage) in a forced air oven at 80°-90° C. for 30 minutes.

EXAMPLE II

Preparation Of Representative Cationic Charge Modified Membrane*

\* Pursuant to USSN 314,307, now U.S. Pat. No. 4,473,474, and EPC Publication 0 050 864 to Ostreicher et al.

Two layers of wet microporous membrane, made as in Example I, were laminated together and dried to 20–25% moisture.

The double layer of membrane was introduced into a 1.25% by weight solution of Hercules R4308. The pH of the bath was 10.5

This bath was produced by diluting 38 lbs. (17.17 Kg.) of Hercules R4308 resin from its initial 20% by weight concentration to 5%. Five normal (5N) sodium hydroxide solution was then added to raise the pH to 10.5. The solution was then diluted with D.I. water having greater than 150,000 ohm-cm resistivity in a ratio (volume) 2.5:1. The total volume of bath solution was 60 gallons.

Upon exiting this bath, the membrane was wiped on the bottom surface to remove excess water. A 3 minute air soak with cool air movement was used before the membrane entered the secondary charge modifying agent bath.

This bath was produced by adding 0.023% tetraethylene pentamine by weight or 0.113 lbs. (0.0513 kg) to 60 gallons (227. liters) of D.I. water (at least 150,000 ohm -cm resistivity). The pH was about 9. The immersion conditions are identical to the first bath of primary charge modifying agent. The membrane was then wrapped around a take up roll. The take up roll of wet membrane was stored for at least 3 hours. The roll was then dried at 250° F. (121° C.) for 3 minutes to complete the reaction of the charge modifying agents.

The membrane was then washed in a subsequent operation and checked for extraction levels.

EXAMPLE III

In all of the following Examples nylon membrane was treated with a water solution of charge modifying agent and, where indicated, a cross-linking agent. Since solubility of some cross-linking agents in water is limited, the agent was first diluted in alcohol and then mixed with the aqueous solution of anionic charge modifying agent. The membrane was drained, washed and dried in an oven at from 100° C. to 125° C. for 15–20 minutes. The membrane was then washed. The treatment and test results are tabulated on the attached Table 1.

TABLE I

| A Sample Number | 1 Test No. | 2 Starting Membrane Description | 3 Treatment Mode | COMMENTS |
|---|---|---|---|---|
| C6-28-1 | 1 | 0.2 micron, nylon | PSSA[1]/EGDGE[2] | 4% PSSA, 2.7% EGDGE in treatment solution. |
| C6-28-2 | 2 | *0.2 micron, nylon | PAA[3] | 1.3% PAA in treatment solution. |
|  | 3 | charged cationically | PAA |  |
| C6-31-1 | 4 | *0.2 micron, nylon | PAA | 1% PAA in treatment solution. |
| C6-32-1 | 6 | 0.2 micron, nylon | PSSA/EGDGE | 5.5% PSSA, 1.8% EGDGE in treatment solution |
| C6-34-1 | 7 | 0.2 micron, nylon | PAA/PLURONIC[4] | Treatment with 1% Pluronic solution followed by 1% PAA solution. |
| C6-34-2 | 8 | 0.2 micron, nylon | 1884[5]/PAA | Treatment with 1% solution 1884 (cationic agent) followed by 1% PAA solution. |
| C6-35-1 | 9 | 0.2 micron, nylon | 1884/PMA[6] | Treatment with 1% solution 1884 (cationic agent) followed by 1% PAA solution. |
| C6-35-2 | 10 | 0.2 micron, nylon | PAA/PLURONIC | .88% PAA, .12% Pluronic treatment solution. |
| C6-35-4 | 11 | 0.2 micron, nylon | PAA/PLURONIC | 1.76% PAP, .12 Pluronic treatment solution |
| C6-36-1 | 12 | 0.2 micron, nylon | PAA/PLURONIC | 1.58% PAA, .21% Pluronic treatment solution |
| C6-36-2 | 13 | 0.2 micron, nylon | PAA/PLURONIC | 3.53% PAA, .12% Pluronic treatment solution |
| C6-37-1 | 14 | 0.2 micron, nylon | PAA/PLURONIC | 3.5% PAA, .12% Pluronic treatment solution |
| C6-41-2 | 15 | 0.45 micron, nylon | 4308[7]-TEPA[8]*/PAA | Cationic solution followed by 1.3% PAA |
| C6-44-2 | 16 | 0.65 micron, nylon | PAA/C-303[9] | 1.3% C-303, 3.6% PAA solution |
| C6-45-2 | 17 | 0.65 micron, nylon | 4308-TEPA*/PAA | Cationic solution followed by 2.0% PAA |
| C6-46-1 | 18 | 0.65 micron, nylon | PAA/C-303 | 5% C-303, 13% PAA solution |
| C6-46-2 | 19 | 0.65 micron, nylon | PSSA/C-35201[10] | 4.3% C-35201, 5% PSSA solution |
| C6-47-1 | 20 | 0.65 micron, nylon | PSSA/C-35201 | 1.44% C-35201, 1.6% PSSA treatment solution |
| C6-47-2 | 21 | 0.2 micron, nylon | PSSA/C-35201 | 1.44% C-35201, 1.6% PSSA treatment solution |
| C7-4-1 | 22 | 0.2 micron, nylon | PAA/C-303 | 3.6% PAA of mw 104,000 and 1.3% C-303 treatment solution. |
| C7-4-2 | 23 | 0.45 micron, nylon | PAA/C-303 | 3.6% PAA of mw 104,000, 1.3% C-303 treatment solution. |
| C7-9-2 | 24 | 0.45 micron, nylon | PAA/C-303 | 2.1% PAA of mw 104,000, .77% C-303 treatment solution. |
| C7-14-2 | 25 | 0.20 micron, nylon | PAA/C-303 | 2.1% PAA of mw 104,000, .77% C-303 treatment solution. |
| C7-16-1 | 26 | 0.45 micron, nylon | PAA/C-303 | 1% PAA of mw 104,000, .37% C-303 treatment solution. |
| C7-17-1 | 27 | 0.45 micron, nylon | PAA/C-303 | 1.2% PAA of mw 243,000, .43% C-303 treatment solution. |
| C7-18-1 | 28 | 0.45 micron, nylon | PAA/C-303 | .5% PAA of mm 243,000, .19% C-303 treatment solution. |
| C8-30-1 | 29 | 0.45 micron, nylon | PAA/B-65[11] | Hollow fibers 2.% PAA, 1.5% B-65 treatment solution. |
| C9-48-2 | 30 | 0.45 micron, nylon | PAA/B-65 | 1.% PAA, .75% B-65 treatment solution. |
| C10-1-1 | 31 | 0.45 micron, nylon | PAA/B-65 | 1.% PAA, .75% B-65 treatment solution. |
| C10-47-1 | 32 | 0.2 micron, nylon | DOWFAX[12] | 1% DOWFAX treatment solution. |
| C10-47-2 | 33 | 0.2 micron, nylon | PAA/B-65 | 1% PAA, .75% B-65 treatment solution. |

| A Sample Number | B Starting Membrane | 1 Test No. | 2 Starting Membrane Description | 3 Treatment Mode | 4 Before Treatment | | | | 5 After Treatment | | | |
|---|---|---|---|---|---|---|---|---|---|---|---|---|
|  |  |  |  |  | IBP | FAOP | FLOW | MB | IBP | FAOP | FLOW | MB |
| C6-28-1 | 170-B17-0102 | 1 | 0.2 micron, nylon | PSSA[1]/EGDGE[2] | 43 | 47 | 105 | 2.4 | — | — | — | — |
| C6-28-2 | 141-A36-02 | 2 | *0.2 micron, nylon | PAA[3] | 53 | 60 | 66 | 1.5 | — | — | — | — |
|  | 141-A36-01 | 3 | charged cationically | PAA | 53 | 60 | 66 | 1.5 | — | — | — | — |
| C6-31-1 | 141-A36-02 | 4 | *0.2 micron, nylon | PAA | 53 | 60 | 66 | 1.5 | — | — | — | — |
|  | 141-A36-01 | 5 | charged cationically | PAA | 53 | 60 | 66 | 1.5 | 47.5 | 61.5 | 70.0 | 73.0 |
| C6-32-1 | 170-B17-0102 | 6 | 0.2 micron, nylon | PSSA/EGDGE | 43 | 47 | 105 | 2.4 | 39.0 | 42.0 | 100.0 | 94.0 |
| C6-34-1 | 170-B17-0102 | 7 | 0.2 micron, nylon | PAA/PLURONIC[4] | 43 | 47 | 105 | 2.4 | 34.0 | 37.0 | 88.0 | 43.0 |
| C6-34-2 | 170-B17-0102 | 8 | 0.2 micron, nylon | 1884[5]/PAA | 43 | 47 | 105 | 2.4 | 42.0 | 47.0 | 84.0 | 42.0 |
| C6-35-1 | 170-B17-0102 | 9 | 0.2 micron, nylon | 1884/PMA[6] | 43 | 47 | 105 | 2.4 | — | — | — | — |
| C6-35-2 | 170-B17-0102 | 10 | 0.2 micron, nylon | PAA/PLURONIC | 43 | 47 | 105 | 2.4 | 36.0 | 39.0 | 98.0 | 55.3 |
| C6-35-4 | 170-B17-0102 | 11 | 0.2 micron, nylon | PAA/PLURONIC | 43 | 47 | 105 | 2.4 | 37.0 | 44.0 | 92.0 | 171.3 |
| C6-36-1 | 170-B17-0102 | 12 | 0.2 micron, nylon | PAA/PLURONIC | 43 | 47 | 105 | 2.4 | 36.0 | 42.0 | 98.0 | 170.6 |
| C6-36-2 | 170-B17-0102 | 13 | 0.2 micron, nylon | PAA/PLURONIC | 43 | 47 | 105 | 2.4 | 40.0 | 44.0 | 80.0 | 292.7 |
| C6-37-1 | 170-B17-0102 | 14 | 0.2 micron, nylon | PAA/PLURONIC | 43 | 47 | 105 | 2.4 | — | — | — | — |
| C6-41-2 | 246-D12-0204 | 15 | 0.45 micron, nylon | 4308[7]-TEPA[8]/PAA | 34 | 38 | 151 | — | 34.0 | 38.0 | 160.0 | |
| C6-44-2 | 252-D25-09 | 16 | 0.65 micron, nylon | PAA/C-303[9] | 21 | 23 | 400 | — | 21.5 | 24.0 | 402.0 | — |
| C6-45-2 | 252-D25-09 | 17 | 0.65 micron, nylon | 4308-TEPA/PAA | 21 | 23 | 400 | — | 21.0 | 23.5 | 420.0 | — |
| C6-46-1 | 252-D25-09 | 18 | 0.65 micron, nylon | PAA/C-303 | 21 | 23 | 400 | — | 20.5 | 23.0 | 376.0 | — |
| C6-46-2 | 252-D25-09 | 19 | 0.65 micron, nylon | PSSA/C-35201[10] | 21 | 23 | 400 | — | — | — | — | — |
| C6-47-1 | 252-D25-09 | 20 | 0.65 micron, nylon | PSSA/C-35201 | 21 | 23 | 400 | — | 20.0 | 23.0 | 208.0 | — |
| C6-47-2 | 170-B17-0102 | 21 | 0.2 micron, nylon | PSSA/C-35201 | 43 | 47 | 105 | 2.4 | — | — | — | — |
| C7-4-1 | 270-E13-0102 | 22 | 0.2 micron, nylon | PAA/C-303 | 47 | 51 | 90 | 2.5 | 47.0 | 53.0 | 74.0 | 220.0 |
| C7-4-2 | 289-E34-0304 | 23 | 0.45 micron, nylon | PAA/C-303 | 32 | 54 | 190 | 2.5 | 31.0 | 34.0 | 200.0 | 110.0 |
| C7-9-2 | 289-E34-0304 | 24 | 0.45 micron, nylon | PAA/C-303 | 32 | 54 | 190 | 2.5 | 31.0 | 35.0 | 190.0 | 100.0 |
| C7-14-2 | 290-E40-0304 | 25 | 0.20 micron, nylon | PAA/C-303 | 45.2 | — | 68 | — | 52.0 | 56.0 | 76.0 | 157.0 |
| C7-16-1 | 289-E34-0304 | 26 | 0.45 micron, nylon | PAA/C-303 | 32 | 54 | 190 | 2.5 | 32.0 | 35.0 | 200.0 | 145.0 |
| C7-17-1 | 289-E34-0304 | 27 | 0.45 micron, nylon | PAA/C-303 | 32 | 54 | 190 | 2.5 | 32.0 | 35.0 | 192.0 | 207.0 |
| C7-18-1 | 289-E34-0304 | 28 | 0.45 micron, nylon | PAA/C-303 | 32 | 54 | 190 | 2.5 | 29.0 | 33.0 | 164.0 | 100.0 |
| C8-30-1-2 | Hollow Fibers | 29 | 0.45 micron, nylon | PAA/B-65[11] | 30 | 34 | — | — | — | — | — | — |

TABLE I-continued

| | | | | | | | | | | | | |
|---|---|---|---|---|---|---|---|---|---|---|---|---|
| C9-48-2 | S20881 | 30 | 0.45 micron, nylon | PAA/B-65 | 30.2 | 36 | 180 | — | 33.0 | 37.0 | 168.0 | 72.0 |
| C10-1-1 | S20881 | 31 | 0.45 micron, nylon | PAA/B-65 | 30.2 | 36 | 180 | — | — | — | — | — |
| C10-47-1 | S22462 | 32 | 0.2 micron, nylon | DOWFAX[12] | 42.3 | 47.8 | 92.5 | 6.1 | 43.0 | 47.0 | 97.0 | 13.0 |
| C10-47-2 | S22462 | 33 | 0.2 micron, nylon | PAA/B-65 | 42.3 | 47.8 | 92.5 | 6.1 | 42.0 | 48.0 | 93.0 | — |

FOOTNOTES:
*Cationic charge modified pursuant to "Best Mode" in USSN 314,307 now U.S. Pat. No. 4,473,474 to Ostreicher et al.
IBP means Initial Bubble Point, psig.
FAOP means Foam All Over Point, psig.
FLOW aforedescribed "FLOW" test, ml./min.
MB means aforedescribed Methylene Blue Test, mins.
[1]PSSA is polystyrene sulfonic acid (POLYSCIENCE):

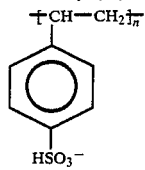

[2]EGDGE is ethylene glycol diglycidyl ether (POLYSCIENCE).
[3]PAA is polyacrylic acid (GOOD-RITE K702, 722, 732, 752, GOODRICH):

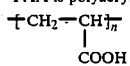

[4]Pluronic is a polyol (BASF WYANDOTTE).
[5]1884 is polyamide - polyamine epichlorohydrin resin (POLYCUP, HERCULES).
[6]PMA is polymaleic anhydride (GANTREZ AN, GAF):

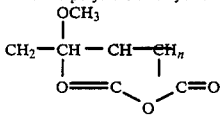

[7]4308 is polyamido - polyamine epichlorohydrin resin (POLYCUP, HERCULES).
[8]TEPA is tetraethylene pentamine (UNION CARBIDE): $H_2N(CH_2)_2NH(CH_2)_2NH(CH_2)_2NH_2NH(CH_2NH_2$
[9]C-303 is hexa methoxy-methyl melamine resin (CYMEL 303, AMERICAN CYANAMID).
[10]C-35201 is water borne epoxy resin (CMD 35201, CELANESE).
[11]B-65 is methylated urea formaldehyde resin (BEETLE 65, AMERICAN CYANAMID).
[12]Dowfax is sodium mono and didodecyl disulfonated diphenyloxide (DOW).

EXAMPLE IV

Evaluation Of Membranes For Plasmapheresis

Four nylon membranes 0.45 micron untreated (Example I), 0.45 micron anionic (Sample 24) or 0.45 micron cationic (Example I) and 0.2 micron untreated (Example I), were evaluated for the separation of plasma and cellular components of blood.

The test criteria is the rate of hemoglobin appearance into the plasma phase vs. the filtration rate. The test procedure and results are described below. The 0.2 micron untreated membrane gave the best results, however, the charged modified 0.45 micron membranes performed better than the untreated 0.45 micron membrane. Four membranes (0.45 micron untreated, 0.45 micron anionic, 0.45 micron cationic, and 0.2 micron untreated) were presented for comparison with the membrane employed most frequently in prior studies with this system, SARTORIUS 0.45 micron cellulose nitrate.

Methods And Apparatus

The system employed in these studies is shown in FIG. 1. A modified SARTORIUS membrane cell is assembled with three 16×16 cm membrane sheets and connected as shown. Plasma (250 ml) is circulated over the membranes as a pretreatment. Approximately 300 ml of whole human blood (drawn no more than 3 hours prior to the run) is added to a beaker containing 500 IU of heparin. The blood pump is started and set to read "10" on the speed meter (about 38 ml/min). After about 4 minutes for stabilization and sufficient washout of the filtrate side of the cell by fresh filtrate, the filtration rate is measured by diverting the filtrate into a graduated cylinder and samples of filtrate and blood are taken for analysis. The blood pump speed meter reading is incremental by 5 and the procedure is repeated until two obviously pink/red samples have been obtained.

Filtrate samples are analyzed for hemoglobin (Hgb) by spectrophotometric techniques. Blood samples are analyzed for hematocrit, and plasma and total Hgb by a Coulter counter. One sample each of blood and filtrate is selected for protein electrophoresis.

Results And Discussion

Observed and computed results of the membrane tests are presented in Tables II through VI. Each table lists; the input blood flow rate, QI, the filtration rate, QF; the concentration of Hgb in the plasma phase of the inflowing blood, $C_I$ (mg/dl); the Hgb concentration in the filtrate, CF; and the rate of Hgb appearance into the plasma phase, D, for the indicated membrane; where D is approximated as: $D=QI(C_F-C_I)/100$ all values are for a three membrane system.

The optimally functioning primary separation unit of a plasmapheresis system must be capable of producing the greatest flow of plasma with the least damage to the cellular blood components. In the terms employed above, $Q_F$ must be maximized while holding D to some arbitrarily acceptable value. The evaluation of the five membranes tested can most readily be performed in this manner from a plot of the Hgb appearance rate, D, as a function of the filtrate rate, Q, shown in FIG. 2. The curve furthest to the lower right will specify the membrane of choice, based on the above stated criteria. Clearly, the 0.2μ untreated membrane gave the best results. At the Hgb appearance rate 1.5 mg/min, this test produced 9.3 ml/min of filtrate. The second best performer, the 0.45μ negative gave 74 percent (6.9 ml/min) of this value for the same criterion. The control membrane (Satorius 0.45μ cellulose nitrate) produced only 4.6 ml/min or 49 percent as much filtrate as did the 0.2μ.

Interestingly, the 0.45μ untreated membrane gave the poorest performance of all while the anionic and cationic modifications of this membrane produced filtration rates about midway between those of the neutral 0.2 and 0.45μ. This may be due to a greater number of cells being convected into the 0.45μ membrane with subsequent plugging of the membrane pore structures. Subjective visual examination of the membranes after each run found that "staining" of the membranes (probably due to the cells impacted into pores) appeared to correlate inversely with the maximum filtration rate, lending some credence to this hypothesis. This observation suggests that the process involved in modifying the membranes may make them less susceptible to plugging by such a mechanism, thus raising the maximum filtration rate. The anionic modification gave slightly better results than the cationic.

All protein electrophoresis results for the filtrate samples had the appearance of normal plasma results.

TABLE II

Results of the Sartorius Cellulose Nitrate 0.45u Membrane Test

| $Q_I$ (ml/min) | QF (ml/min) | $C_I$ (mg/dl) | $C_F$ (mg/dl) | D (mg/min) |
|---|---|---|---|---|
| 60 | 3.0 | 24.6 | 24.6 | * |
| 100 | 4.7 | 28.6 | 30.1 | 1.50 |
| 132 | 5.3 | 35.1 | 36.9 | 2.38 |
| 163 | 7.0 | 41.0 | 42.4 | 2.28 |
| 192 | 7.3 | 53.6 | 56.1 | 4.80 |
| 223 | 6.5 | 77.9 | 82.0 | 9.14 |

*Undetectable

TABLE III

Results of the 0.45u Untreated Membrane Test

| $Q_I$ (ml/min) | QF (ml/min) | $C_I$ (mg/dl) | $C_F$ (mg/dl) | D (mg/min) |
|---|---|---|---|---|
| 37.8 | 1.1 | 18.4 | 18.5 | 0.04 |
| 68.6 | 1.3 | 18.7 | 18.8 | 0.07 |
| 99.4 | 2.1 | 19.2 | 19.3 | 0.10 |
| 130 | 3.5 | 24.1 | 25.2 | 1.43 |
| 161 | 4.4 | 40.6 | 43.6 | 4.83 |
| 192 | 5.4 | 68.2 | 72.4 | 8.06 |

TABLE IV

Results of the 0.2u Untreated Membrane Test

| $Q_I$ (ml/min) | QF (ml/min) | $C_I$ (mg/dl) | $C_F$ (mg/dl) | D (mg/min) |
|---|---|---|---|---|
| 37.8 | 4.7 | 15.7 | 19.2 | 1.3 |
| 68.6 | 6.4 | 20.0 | 22.3 | 1.6 |
| 99.4 | 7.8 | 23.1 | 24.3 | 1.2 |
| 130 | 9.2 | 26.8 | 27.9 | 1.4 |
| 161 | 9.6 | 31.8 | 32.9 | 1.8 |
| 192 | 9.9 | 38.7 | 40.1 | 2.7 |
| 223 | 10.1 | 80.8 | 87.9 | 15.8 |
| 253 | 10.3 | 139. | 148. | 22.8 |

TABLE V

Results of the 0.45u Positive Membrane Test

| $Q_I$ (ml/min) | QF (ml/min) | $C_I$ (mg/dl) | $C_F$ (mg/dl) | D (mg/min) |
|---|---|---|---|---|
| 37.8 | 2.9 | 26.1 | 27.9 | 0.7 |
| 68.6 | 4.8 | 29.7 | 31.6 | 1.3 |
| 99.4 | 6.1 | 34.2 | 35.9 | 1.7 |
| 130. | 73 | 47.8 | 51.7 | 5.1 |
| 161. | 8.3 | 137. | 158. | 33.8 |

TABLE VI

Results of the 0.45u Negative Membrane Test

| $Q_I$ (ml/min) | QF (ml/min) | $C_I$ (mg/dl) | $C_F$ (mg/dl) | D (mg/min) |
|---|---|---|---|---|
| 37.8 | 4.0 | 26.9 | 27.6 | 0.26 |
| 68.6 | 5.6 | 29.1 | 30.1 | 0.69 |
| 99.4 | 7.0 | 34.8 | 36.5 | 1.69 |
| 130. | 6.9 | 48.1 | 51.2 | 4.03 |
| 161. | 7.2 | 64.9 | 68.1 | 5.15 |
| 192. | 7.3 | 114. | 122. | 15.36 |

EXAMPLE V

Evaluation Of Hollow Fiber Modules For Blood Component Separation

The present evaluation involves six hollow fiber modules: two each of the unmodified fiber, anionic (negative) surface modified, and cationic (positive) surface modified.

The anionic fibers were prepared pursuant to Sample 29 (C-8-30-2). The cationic fibers were treated in a manner similar to Example II (C-8-31-1)

Apparatus And Methods

The system employed in these studies is shown in FIG. 3. It consists of a Travenol Laboratories roller-type blood pump (used on the Travenol RSP hemodialyzer), clot filter, 0-760 mm Hg pressure gauge, Swagelok fittings for connection to the hollow fiber module, Manostat Calcuflow flow meter, and fluid reservoir with stirrer.

The apparatus is assembled with the desired test module oriented vertically (with flow from top to bottom) and 250 ml of human plasma is added to the reservoir beaker. The plasma is circulated through the system for 15 minutes at approximately 100 ml/min. This allows for leak checks and for deposition of plasma proteins on rough or otherwise biologically reactive surfaces. Pretreatment of the system in this manner has been shown to decrease the degree of hemolysis that occurs on the initial contact of the blood with the membrane. At the end of the pretreatment, the pump is stopped and the pump inlet line is transferred to a second reservoir beaker containing 250-300 ml of fresh human blood and 500 IU of heparin. An initial blood sample is taken from the beaker. The pump is restarted and the module and filtrate outlet lines are moved to the blood beaker when the first evidence of blood leaving the module is noted. Timing of the run begins at this point.

The remainder of the test is divided into intervals of ten minutes each. At the midpoint of each interval, the inlet pressure and filtration rate are recorded. At the end of each interval, a filtrate sample is taken for analysis. Each sample is immediately centrifuged and the plasma is separated from any cells or fragments that are present. This will lessen the likelihood of falsely high plasma hemoglobin values. The pump is incremented and the next interval begins. At the end of the test, a blood sample is taken from the beaker to provide a check on the mass balance.

Results And Discussion

Table VII lists the characteristics of the hollow fiber modules tested. Observed and computed results of the tests are presented in Tables VIII—XIII. Each table lists each input blood flow rate tested, $Q_I$ (ml/min); the corresponding filtration rate, $O_F$ (ml/min); concentration of Hgb in the plasma phase of the inflowing blood at the end of the measurement interval, $C_I$(mg/dl); Hgb concentration in the filtrate at the end of the interval, $C_F$ (mg/dl); and rate of Hgb release in the plasma, D (mg/min), where D is approximated as: $D = Q_I (C_F - C_I)/100$. The values for the Hgb appearance rate D have been corrected for the hemolysis effects of the blood pump and other hardware and represent only the effects produced by the test module.

It should be noted that blood leaks into the filtrate were a significant problem with three of the surface modified fiber modules: 8207-2 (anionic), 8207-5 (cationic) and 8207-6 (cationic). In the test of module 8207-2 (anionic) the leak was so severe that it was difficult to distinguish between the fluid in the filtrate and blood outlet lines until the samples had been centrifuged. Normally, the filtrate has the appearance of plasma with slight brown or pink coloration. The extent to which this leakage affected the results is unknown.

FIG. 4 presents the filtration rate for each module as a function of the blood inflow rate. With the exception of the anionic unit 8207-2 (which developed the leak early in the test), the surface modified fibers produced greater filtration rates for a given blood flow rate than did the unmodified fibers. At an inflow rate of 300 ml/min, the modified fiber modules averaged about 29 percent more filtrate than the untreated fiber modules.

FIGS. 5–7 present the rate of hemoglobin appearance, D, as a function of the filtration rate $Q_F$, for the various modules. FIG. 5 shows the performance of the unmodified fibers. Both modules exhibited relatively high initial hemolysis rates which declined sharply as the filtration rate increased. After reaching a minimum rate of hemolysis, corresponding to filtration rates of 40–45 ml/min, hemolysis increased with further increases in filtration rate. The minimum hemolysis rates for both modules were below the arbitrary standard of 1.5 mg/min. (By this standard, a patient with a plasma volume of 3 liters could be treated for 6 hours and have the plasma Hgb increase by 15 mg/dl. The normal plasma Hgb is about 7 ml/dl.)

FIG. 6 presents the results for the modules with the cationic modified fibers. Module 8207-5 performed similarly to the unmodified units, although the minimum hemolysis rate was not as low. The other module, 8207-6, exhibited extremely high initial hemolysis. The rate for this module did drop significantly and might have reached an acceptably low value if the blood leak had not occurred.

The results of the anionic surface modified fibers are presented in FIG. 7. Both modules performed similarly at low filtration rates with results much like the unmodified fibers. Interestingly, module 8207-7, which did not leak, did not exhibit the minimum in the hemolysis rate seen in other tests, but instead seemed to have an asymptote for the rate. This module's performance was far superior to all others. Module 8207-2 developed the blood leak before sufficient data could be collected to confirm this result. It should thus be possible to obtain high flow rates of low Hgb plasma with anionic surface modified fiber.

A problem common to all of the tests was significant initial hemolysis rates. There are a number of factors which may be responsible including roughness of the fiber walls, particularly at the entrance of the fiber. Microscopic examination of an unused module may be helpful in this determination and revision of the fiber potting procedure to produce smoother fiber ends may be advantageous for those modules to be used in blood separation.

Finally, a number of paired filtrate and outlet blood samples were tested to determine if sieving of albumin by the fibers could be detected. No significant difference was found in the results. If sieving occurs, it is probably quite small.

TABLE VII

Hollow Fiber Module Characteristics

| Module Codes | 8148-48/49 | 8207-2/7 | 8207-5/6 |
|---|---|---|---|
| Surface Modification | None | Anionic (negative) | Cationic (positive) |
| Treatment Mode | — | Sample 29 | Example II |
| Number of fibers | 130 | 120 | 120 |
| Fiber ID (cm) | 0.0376 | .0378 | 0.0358 |
| Fiber OD (cm) | 0.0627 | 0.0638 | 0.0630 |
| Fiber length (cm) | 16 | 16 | 16 |
| Internal Area (sq cm) | 246 | 228 | 216 |
| IBP (psi) | 31.0 | 33.8 | 32.1 |
| FAOP (psi) | 34.2 | 37.0 | 36.0 |
| FLOW (ml/min-psi-cm$^2$) | 0.37 | 0.38 | 0.35 |
| Module Test Pressure (psi) | 10 | 10 | 7/10 |

TABLE VIII

Module 8148-48 (Untreated) Data

| $Q_I$ (ml/min) | QF (ml/min) | $P_{inlet}$ mmHg | $C_I$ (mg/dl) | $C_F$ (mg/dl) | D (mg/min) |
|---|---|---|---|---|---|
| 116 | 21.8 | * | 55.2 | 65.6 | 12.1 |
| 174 | 29.0 | * | 73.9 | 76.7 | 4.9 |
| 249 | 33.3 | * | 82.6 | 83.5 | 2.2 |
| 322 | 39.1 | * | 90.0 | 90.6 | 1.9 |
| 396 | 45.0 | * | 119.2 | 120.9 | 6.7 |

*Pressure monitor failed

TABLE IX

Module 8148-49 (Untreated) Data

| $Q_I$ (ml/min) | QF (ml/min) | $P_{inlet}$ mmHg | $C_I$ (mg/dl) | $C_F$ (mg/dl) | D (mg/min) |
|---|---|---|---|---|---|
| 116 | 23.5 | 225–238 | 47.1 | 53.9 | 7.9 |
| 174 | 30.0 | 353–373 | 65.0 | 67.5 | 4.4 |
| 249 | 36.0 | 472–503 | 81.9 | 83.5 | 4.0 |
| 322 | 42.5 | 607–647 | 92.6 | 93.3 | 2.3 |
| 396 | 55.2 | 749–790 | 126.0 | 127.8 | 7.1 |

TABLE X

Module 8207-5 (Cationic) Data

| $Q_I$ (ml/min) | QF (ml/min) | $P_{inlet}$ mmHg | $C_I$ (mg/dl) | $C_F$ (mg/dl) | D (mg/min) |
|---|---|---|---|---|---|
| 116 | 20.5 | 266–273 | 35.0 | 40.7 | 6.6 |
| 174 | 27.0 | 389–407 | 48.2 | 50.2 | 3.5 |
| 249 | 36.5 | 531–553 | 61.7 | 63.1 | 3.5 |
| 322 | 45.0 | 872–703 | 77.1 | 78.2 | 3.5 |

TABLE XI

Module 8207-6 (Cationic) Data

| $Q_I$ (ml/min) | QF (ml/min) | $P_{inlet}$ mmHg | $C_I$ (mg/dl) | $C_F$ (mg/dl) | D (mg/min) |
|---|---|---|---|---|---|
| 116 | 24.5 | 320–333 | 102.8 | 122.4 | 22.7 |
| 174 | 32.0 | 476–500 | 161.1 | 169.4 | 14.4 |
| 249 | 39.0 | 647–693 | 198.2 | 201.7 | 8.7 |
| 322 | 56.0 | 750 | 223.8 | 225.6 | 5.8 |

TABLE XII

Module 8207-2 (Anionic) Data

| $Q_I$ (ml/min) | QF (ml/min) | $P_{inlet}$ mmHg | $C_I$ (mg/dl) | $C_F$ (mg/dl) | D (mg/min) |
|---|---|---|---|---|---|
| 116 | 17.5 | 258–272 | 49.6 | 57.9 | 9.6 |
| 174 | 24.2 | 423–445 | 75.9 | 80.1 | 7.3 |
| 249 | 31.0 | 580–615 | 90.5 | 92.1 | 4.0 |

TABLE XII-continued

Module 8207-2 (Anionic) Data

| $Q_I$ (ml/min) | QF (ml/min) | $P_{inlet}$ mmHg | $C_I$ (mg/dl) | $C_F$ (mg/dl) | D (mg/min) |
|---|---|---|---|---|---|
| 322 | 38.5 | 750 | 118.8 | 123.2 | 14.2 |

TABLE XIII

Module 8207-7 (Anionic) Data

| $Q_I$ (ml/min) | QF (ml/min) | $P_{inlet}$ mmHg | $C_I$ (mg/dl) | $C_F$ (mg/dl) | D (mg/min) |
|---|---|---|---|---|---|
| 116 | 23.0 | 272–283 | 33.1 | 37.9 | 5.6 |
| 174 | 32.0 | 408–426 | 48.8 | 51.1 | 4.0 |
| 249 | 38.0 | 572–605 | 60.2 | 61.3 | 2.7 |
| 322 | 49.0 | 735–780 | 76.7 | 77.9 | 3.9 |
| 396 | 70.4 | 780 | 89.5 | 90.2 | 2.8 |

EXAMPLE VI (8109, 8026, I.S. 16250)

Polysulfone was solubilized in 1, 2-dichloroethane (DCE) and reacted with chlorosulfonic acid, washed throughly in DCE and redissolved in dimethylformamide (DFM). (It is important to note that the sulfonated polysulfone is not soluble in DCE as was the base polymer). At this point the sulfonated polymer is relatively free of chlorosulfonic acid and therefore could easily be handled in aqueous media.

Nylon microporous membranes have been charge modified with dilute solutions of the sulfonated polysulfone polymer (SPS). Such treatment should produce a membrane that is compatible with blood since red blood cells are negatively charged.

Untreated nylon microporous membrane (217-E13-0102) made pursuant to Example I, was charge modified using the sulfonated polysulfone polymer solution produced above. The polymer solution was further diluted to 1:2, 1:5, and 1:8 in dimethyl formamide (DMF). Microporous nylon membranes were equilibrated in the diluted polymer solutions, air dried and then challenged with a dilute solution (0.02 ppm) of methylene blue. Methylene blue is a cationic dye, e.g., a dye with an immobilized positive charge.

The treated membranes exhibited a negative charge when challenged with the methylene blue dye solution, as shown in Table XIV below.

TABLE XIV

| *Conc. SPS | IBP psi | FAOP psi | Flow Rate ml/min | Init psi | Final psi | Ret Time Min |
|---|---|---|---|---|---|---|
| 0 | 46 | 52 | 117 | 3.7 | — | 2 |
| 1:2 | 44 | 51 | 51 | 5.7 | 23.6 | 40 |
| 1:5 | 43 | 53 | 120 | 5.8 | 11.0 | 25 |
| 1:8 | 43 | 52 | 106 | 4.4 | 9.1 | 20 |

*Relative concentrations of sulfonated polysulfone from batch sulfonated polymer solution.

In effect, the nylon membrane has been coated with a polymer containing an immobilized negative charge, e.g., $SO_3-$. The methylene blue, as mentioned before, possesses a positive charge, i.e., $CH_3^3$. The methylene blue is adsorbed to the SPS coated nylon membrane through the $SO_3-$ group on the sulfonated polysulfone.

What is claimed is:

1. A process for the cross-flow filtration of a liquid containing particulate or suspended solid and dissolved solids comprising circulating the liquid tangential to and axially on one side of a charge modified organic polymeric skinless microporous hollow fiber filter membrane, substantially retaining the particulate or suspended solids on said one side, the dissolved solids passing through the membrane and the charge on the membrane repelling similarly charged particulate or suspended particles preventing clogging or blocking of pores through excessive adsorption of said particulate or suspended solids.

2. The process of claim 1, wherein the organic polymeric microporous filter membrane has an internal microstructure throughout said membrane and a charge modifying amount of a charge modifying agent is bonded to substantially all of the membrane microstructure without substantial pore size reduction or pore blockage.

3. The process of claim 1 or 2, wherein the liquid is blood.

4. The process of claim 1 or 2, wherein the organic polymeric microporous membrane is a hydrophilic polyvinylidene flouride.

5. The process of claim 1 or 2, wherein the organic polymeric microporous membrane is a hydrophilic ester of cellulose.

6. The process of claim 1 or 2, wherein the organic polymeric microporous membrane is a hydrophilic nylon.

7. The process of claim 1 or 2, wherein the organic polymeric microporous membrane is a hydrophilic polyhexamethylene adipamide.

8. The process of claim 1 or 2, wherein the charge modifying agent is a water soluble polymer having substituents thereon capable of bonding to the membrane and substituents thereon which are anionic or cationic.

9. The process of claim 1 or 2, wherein the charge modifying agent is anionic and a water soluble polymer having substituents thereon capable of bonding to the membrane and anionic functional groups.

10. The process of claim 9, wherein the anionic functional groups are selected from the group consisting of carboxyl, phosphonous, phosphonic and sulfonic groups or mixtures thereof.

11. The process of claim 9, wherein the anionic functional groups are carboxyl.

12. The process of claim 9, wherein the anionic functional groups are sulfonic.

13. The process of claim 9, wherein the anionic charge modifying agent is a water soluble organic polymer having a molecular weight of about 2,000 to 500,000.

14. The process of claim 9, wherein the anionic charge modifying agent is bonded to the membrane through a cross-linking agent.

15. The process of claim 9, wherein the anionic charge modifying agent is poly (styrene sulfonic) acid having a molecular weight between 2,000 and 300,000.

16. The process of claim 9, wherein the anionic charge modifying agent is poly (acrylic) acid having a molecular weight between 2,000 and 300,000.

17. The process of claim 14, wherein the cross-linking agent is an aliphatic polyepoxide having a molecular weight of less than about 500.

18. The process of claim 17, wherein the polyepoxide is a di- or tri-epoxide.

19. The process of claim 17, wherein the polyepoxide has a molecular weight of from about 146 to about 300.

20. The process of claim 2, wherein the charge modifying agent is a primary charge modifying agent which is a water-soluble organic polymer having a molecular weight greater than about 1,000, wherein each monomer thereof has at least one epoxide group capable of bonding to the surface of the membrane and at least one tertiary amine or quaternary ammonium group.

21. The process of claim 20, wherein a portion of the epoxy groups on the charge modifying agent are bonded to a secondary charge modifying agent selected from the group consisting of:
(i) aliphatic amines which are polyamines having at least one primary amine or at least two secondary amines; and
(ii) aliphatic amines having at least one secondary amine and a carboxyl or hydroxyl substituent.

22. The process of claim 20 or 21, wherein the primary charge modifying agent is a polyamido-polyamine epichlorohydrin resin.

23. The process of claim 21, wherein the secondary charge modifying agent is an amine of the formula:

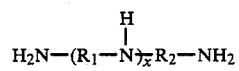

wherein $R_1$ and $R_2$ are alkyl of 1 and 4 carbon atoms and x is an integer from 0 to 4.

24. The process of claim 23, wherein the primary charge modifying agent is a polyamido-polyamine epichlorohydrin resin.

25. The process of claim 23 or 24, wherein the amine is tetraethylene pentamine of the formula:

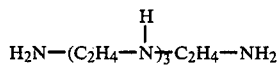

26. The process of claim 2, wherein the charge modifying agent is a cationic charge modifying agent bonded to the membrane micro-structure through an aliphatic polyepoxide cross-linking agent having a molecular weight of less than about 500, wherein the charge modifying agent is selected from the group consisting of:

(i) aliphatic amines which are polyamines having at least one primary amine or at least two secondary amines; and
(ii) aliphatic amines having at least one secondary amine and a carboxyl or hydroxyl substituent.

27. The process of claim 26, wherein the charge modifying agent is an amine of the formula:

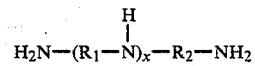

wherein $R_1$ and $R_2$ are alkyl of 1 and 4 carbon atoms and x is an integer from 0 to 4.

28. The process of claim 27, wherein R1 and R2 are ethyl.

29. The process of claim 27, wherein the amine is tetraethylene pentamine of the formula:

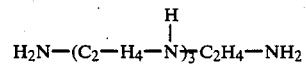

30. The process of claim 26, wherein the polyepoxide is a di- or tri-epoxide.

31. The process of claim 30, wherein the polyepoxide has a molecular weight of from about 146 to about 300.

32. The process of claim 26, wherein the polyepoxide has a formula:

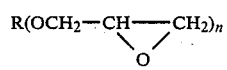

wherein the R is an alkyl of 1 to 6 carbon atoms and n is an integer from 2 to 5.

33. The process of claim 28, wherein the polyepoxide is 1,4-butanediol diglycidyl ether of the formula:

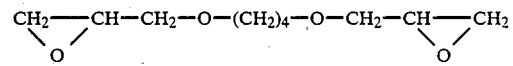

* * * * *